United States Patent [19]

Rostoucher

[11] 4,288,972
[45] Sep. 15, 1981

[54] HAYMAKING MACHINES FOR TEDDING AND WINDROWING

[75] Inventor: Guy Rostoucher, Saverne, France

[73] Assignee: Kuhn S. A., Saverne, France

[21] Appl. No.: 136,398

[22] Filed: Apr. 1, 1980

[30] Foreign Application Priority Data

Apr. 6, 1979 [FR] France ............................ 79 09250

[51] Int. Cl.³ .......................................... A01D 79/00
[52] U.S. Cl. ................................................... 56/370
[58] Field of Search ................... 56/370, 368, 365, 400

[56] References Cited

U.S. PATENT DOCUMENTS

4,144,699  3/1979  Aron ..................................... 56/370

FOREIGN PATENT DOCUMENTS

2636081  2/1978  Fed. Rep. of Germany ........ 56/370
2010323  2/1970  France ................................. 56/370
2307458  11/1976  France ................................. 56/370

Primary Examiner—Jay N. Eskovitz

Attorney, Agent, or Firm—Ernest F. Marmorek

[57] ABSTRACT

A haymaking machine for tedding and windrowing, includes a frame, at least one raking wheel drivably mounted on the frame for rotation about a center axis, a cam centered about the center axis forming an endless loop within a predetermined axial range therearound, and rigid with the frame, and a plurality of tool-carrying arms operatively connected to the raking wheel, which may be switched between a tedding position, in which the arms project radially outwards, and a windrowing position, in which the arms extend in a direction substantially tangential of a circle inscribed in the raking wheel. Each arm is arranged to oscillate about its longitudinal axis, and includes a cam follower connected near the inner end thereof; a guidance device adjacent the cam is provided for guiding each cam follower into engagement with the cam in the windrowing position, so that each arm operatively oscillates about its longitudinal axis within a predetermined angle in the windrowing position, and is free from oscillation in the tedding position.

10 Claims, 6 Drawing Figures

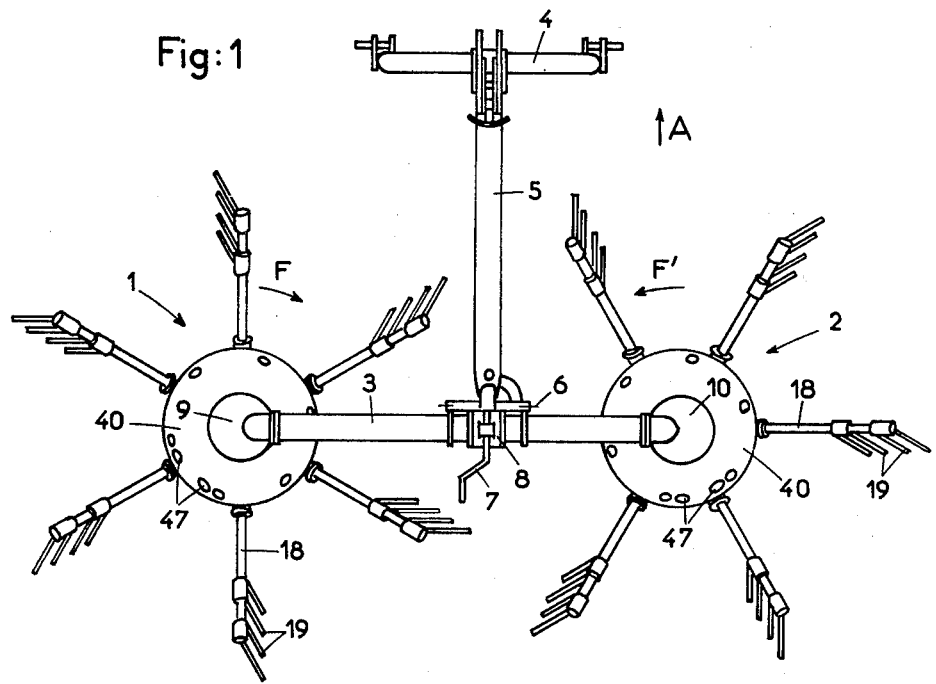
Fig:1
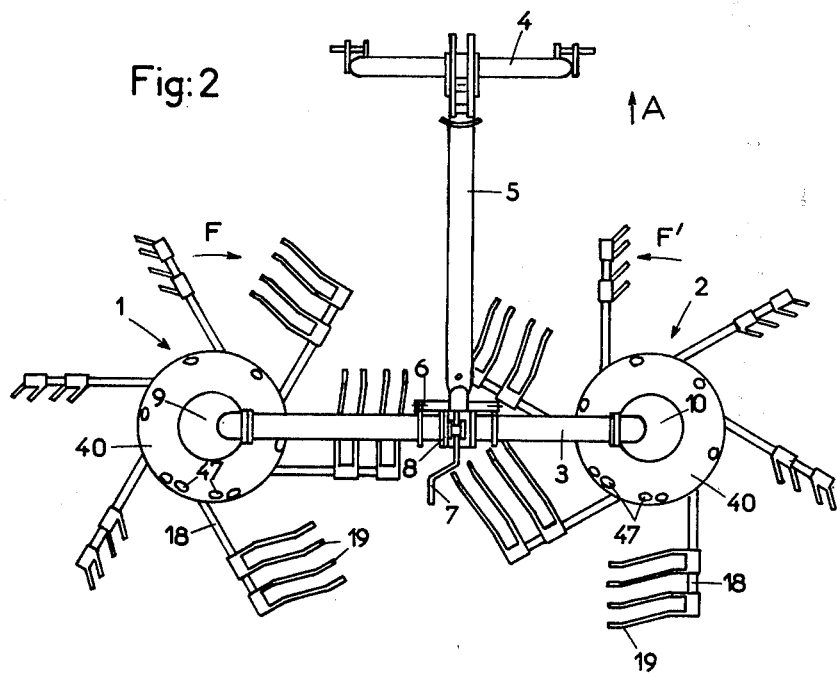
Fig:2

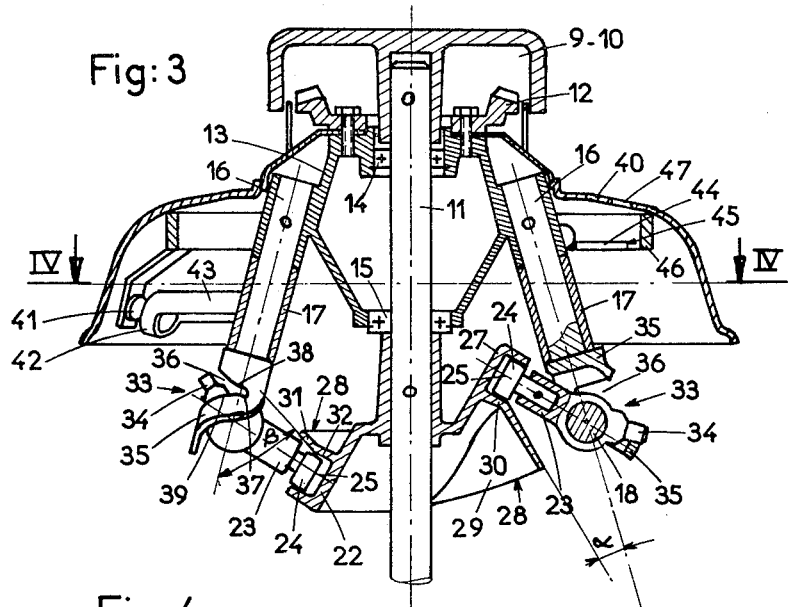
Fig: 3
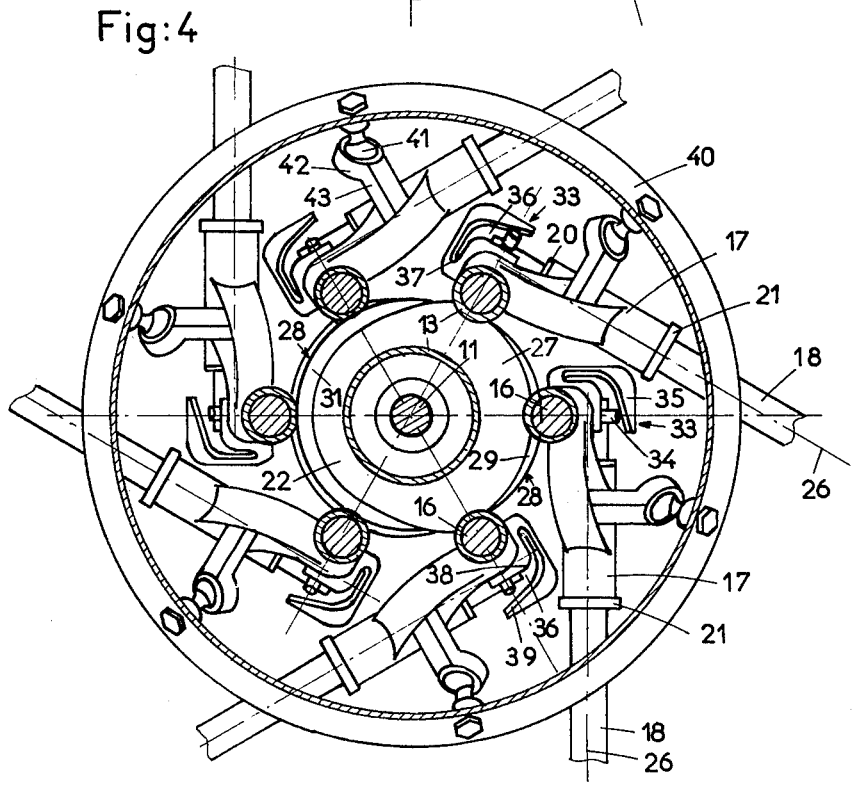
Fig: 4

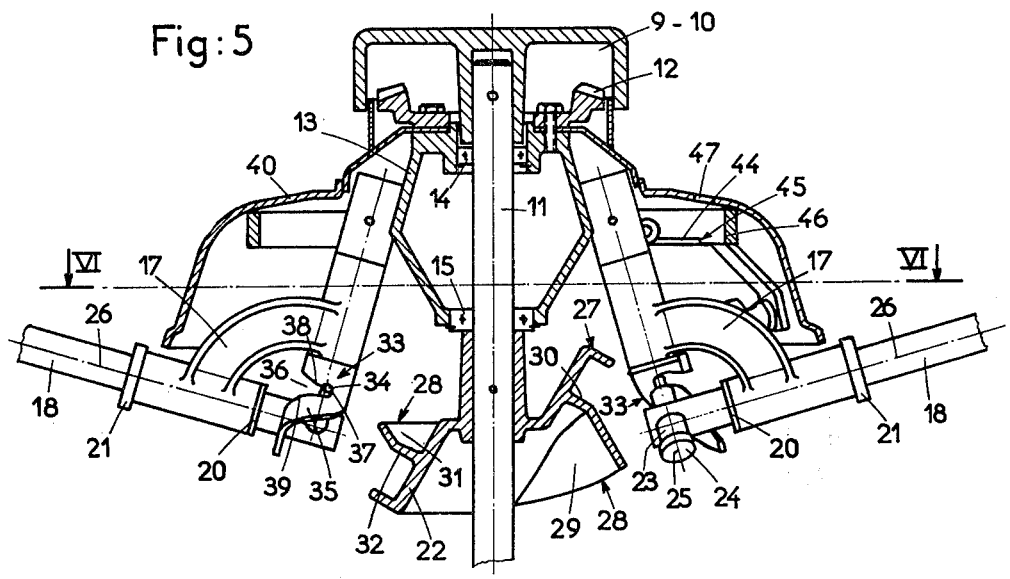
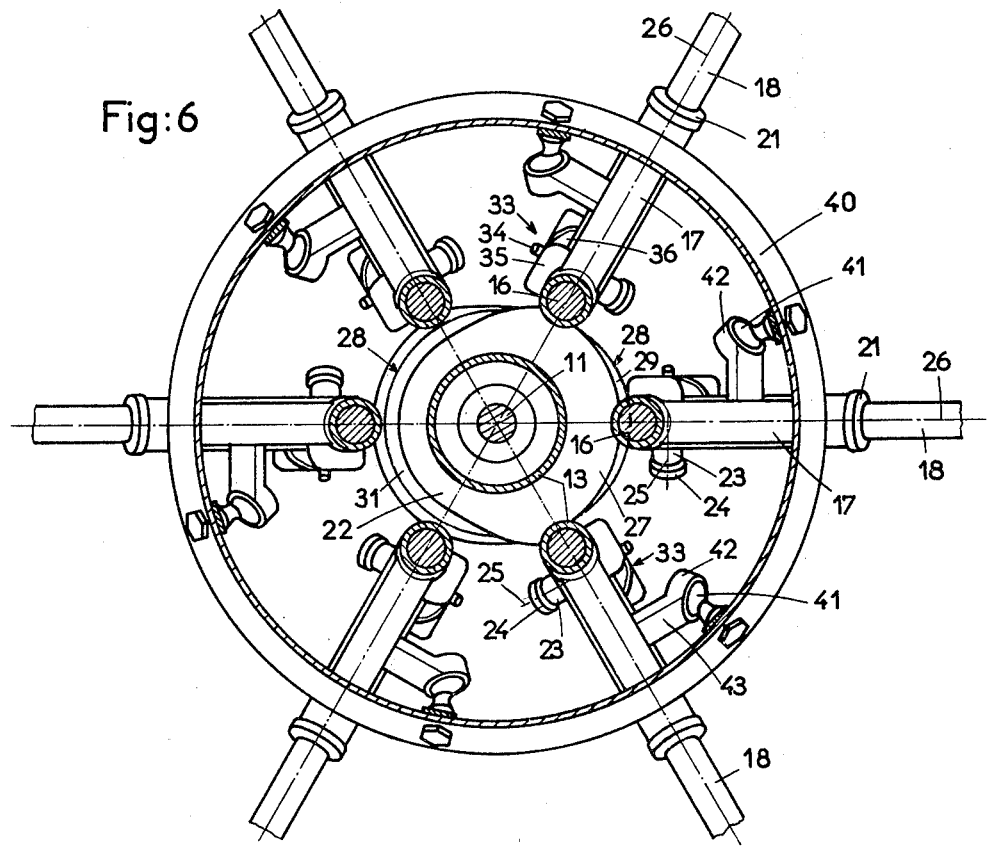

HAYMAKING MACHINES FOR TEDDING AND WINDROWING

BACKGROUND OF THE INVENTION

In a known machine of this kind, and which is described in French Pat. No. 2.010.323, the tool-carrying arms of the machine are moved outwardly for tedding operations by pivoting their support bearing about a substantially horizontal axis, until a corresponding roller of the tool-carrying arm has been withdrawn from the central guide cam. To return the tool-carrying arms to the windrowing position, it is necessary to make sure that the rollers really engage the guide cam, and are not engaged above or below it, which might damage the control mechanism, when the raking wheel is rotating.

Moreover, because of the profile of the guide cam, the rollers of the tool-carrying arms can only engage with, and disengage from, one part of the cam. As this part is located in a flat zone of the cam, each roller has to be successively brought into this zone, in order to be able to withdraw from, or be engaged with the cam. This is a tedious and time-consuming operation.

Also, when passing from one operating setting to the other, the operator may forget to switch one or more of the tool-carrying arms on the same raking wheel from one operation to another. This may not only disrupt operations, but may even cause damage to the machine.

Finally, the means serving to immobilize the tool-carrying arms in relation to the raking wheel during tedding operations are located on the periphery of an upper cover of the machine, and on the tool-carrying arms in the vicinity of the operating tools. Thus the immobilizing means are exposed to dust, and can become tangled with fodder, which may impair their operative usefulness.

In the machine described in French patent application no. 2.307.458 the change of the tool-carrying arms from the windrowing setting to the tedding setting, and vice versa is mechanised. However the disengagement or re-engagement of the rollers with the cam takes place only one at a time, and solely in the flat zone of the cam. There is still a risk of an incorrect adjustment, in the event the user fails to actuate the mechanism causing the change in sufficient time. Lastly, the means to immobilize the tool-carrying arms in relation to the raking wheel during the tedding operation are also exposed to dust, and can thus become entangled with fodder.

In another machine described in German patent application no. 2.636.081, all the tool-carrying arms on the same raking wheel are changed together from the windrowing setting to the tedding setting, and vice versa. However, in this machine the rollers or the cranks will similarly only re-engage with the guide cam in the flat zone of the cam. Consequently, articulation points have to be provided between the studs or cranks and the tool-carrying arms in order to allow the tool-carrying arms to pivot relative to the cranks when the respective rollers cannot enter the guide cam directly when passing to the windrowing setting. In addition, each tool-carrying arm has to be fitted with a spring which bears on the stud or crank, so as to bring about the engagement of its roller with the guide cam on reaching the flat zone of the cam. These articulation points and springs make the machine fragile and unreliable in operation, as the rollers are not positively locked to the guide cam.

Finally, the means provided to immobilize the tool-carrying arms relative to the raking wheel during tedding are also exposed to dust and can become entangled wth fodder.

SUMMARY OF THE INVENTION

One of the principal objects of the present invention is to eliminate the shortcomings mentioned previously by proposing a machine of reliable and sturdy design, in which all the rollers of the tool-carrying arms on the same raking wheel can be withdrawn from, or engaged with the guide cam simultaneously.

To this end, one important feature of the invention is that the machine includes a cam centered about center axis, which forms an endless loop within a predetermined axial range therearound, and is rigid with a frame of the machine, a plurality of tool-carrying arms which may be switched between a tedding position, in which the arms project radially outwards, and a windrowing position, in which the arms extend in a direction substantially tangential of a circle inscribed in the raking wheel of the machine.

Each arm is oscillatable about its longitudinal axis, and includes a cam follower connected near the inner end of each arm, and guidance means adjacent the cam for guiding each cam follower into engagement with the cam in the windrowing position from any position occupied by each cam follower near the periphery of the cam, so that each arm operatively oscillates about its longitudinal axis within a predetermined angle in the windrowing position, and is free from oscillation in the tedding position.

The machine also includes another guide means for guiding the tool-carrying arms towards the tedding position, from the windrowing position from any location occupied by any tool-carrying arm near the periphery of the cam, and for thereafter locking them into the tedding position.

Due to these guide means, all rollers of the same raking wheel may be moved simultaneously to disengage all of them from the guide cam in one operation. Thus, the change of the tool-carrying arms from the windrowing position to the tedding position may also be effected quickly and reliably.

The other guide means are advantageously located near the end of the tool-carrying arms nearest the axis of rotation of the corresponding raking wheel. Thus, the other guide means are remote from the operating tools and well protected against dust and any entangling fodder.

Further objects and advantages of the invention will be set forth in part in the following specification and in part will be obvious therefrom without being specifically referred to, the same being realized and attained as pointed out in the claims hereof.

BRIEF DESCRIPTION OF THE DRAWING

For a fuller understanding of the nature and objects of the invention, reference should be had to the following detailed description, taken in connection with the accompanying drawings, in which:

FIG. 1 is a plan view of the machine in accordance with the invention in the tedding setting, viewed from above;

FIG. 2 is a plan view of the machine in accordance with the invention, in the windrowing setting, viewed from above;

FIG. 3 is an enlarged partial section in elevation through a raking wheel in the windrowing position;

FIG. 4 is a section through the plane IV—IV of FIG. 3;

FIG. 5 is a section substantially as that in FIG. 3 through a raking wheel in the tedding position; and FIG. 6 is a section through the plane VI—VI of FIG. 5.

DESCRIPTION OF THE PREFERRED EMBODIMENTS

Referring now to FIGS. 1 and 2, the machine in accordance with the invention, has two raking wheels 1 and 2 supported by a frame in the form of beam 3. The machine can be connected to a tractor (not shown) by means of coupling devices provided on a chassis 4 located at the front of the machine, considered in its direction of forward movement A. A beam 5 links the chassis 4 to the beam 3. The connection between the beams 3 and 5 is provided by means of a substantially horizontal joint 6 and a threaded crank 7. Turning the crank 7 makes it possible to pivot the beam 3 and the raking wheels 1 and 2 about the joint 6 for the purpose of changing the angle of inclination of the raking wheels 1 and 2 relative to the ground. In this way, the raking wheels 1 and 2 may be advantageously inclined in the direction of forward movement A during tedding operations, in order to lift the fodder, and turn it over in an improved manner, and then be brought into a substantially vertical position for windrowing in order to ensure thorough raking of the fodder over the entire operating region of the raking wheels.

During operation, the raking wheels 1 and 2 are rotated via transmission units (not shown) by a power take-off shaft. The drive is transmitted to the raking wheels 1 and 2 through the gear drive units 8, 9 and 10 mounted on the machine. Wheels 1 and 2 can either turn in mutually opposite directions as shown by the arrows F and F' in FIGS. 1 and 2, or can rotate in the same direction, for example, for lateral windrowing.

As can be seen from FIGS. 3 to 6, each raking wheel 1 and 2 is mounted on a shaft 11 which is itself mounted, in a manner known per se, on a small wheel (not shown) allowing the machine to be moved over the ground. Each raking wheel 1 or 2 is rotated about its shaft 11 by means of respective toothed crown wheels 12 forming part of the gear drive units 9 or 10. Each crown wheel 12 is secured to a respective hub 13, which is rotatably mounted on the shaft 11 with the aid of bearings 14 and 15. Each hub 13 has several pivot shafts 16, which are inclined relative to the shaft 11. Articulated on the shafts 16 are support bearings 17, which support arms 18 carrying operating tools 19 such as prongs, forks or similar tools, best seen in FIGS. 1 and 2. These tool-carrying arms 18 are mounted for free rotation in the support bearings 17, and are restricted in their axial movement by means of two rings 20 and 21 disposed on either side of the bearings 17, and best seen in FIG. 5. A substantially circular guide cam 22 best seen in FIGS. 4 and 6, substantially in the form of a shell, is also affixed to each shaft 11.

At the end facing the shaft 11 of the corresponding raking wheel 1 or 2 each tool-carrying arm 18 is provided with cam-follower means to engage a cam which will be described later. The cam follower means may be implemented as a stud or crank 23 carrying engagement means, such as a roller 24. The studs or cranks 23 are rigidly secured to the tool carrying arms 18, so that the axis of rotation 25 of their respective rollers 24 substantially forms a right angle with the longitudinal axis 26 of the corresponding tool-carrying arms 18. During windrowing, the rollers 24 are engaged with, and move in cam means centered about the shaft 11, which form an endless loop within a predetermined axial range about the shaft 11. The cam means are implemented, for example, by a guide cam 22. (FIGS. 3 and 4). The guide cam 22 includes an upward change of level, or holding groove 27, engaging the tool-carrying arms 18 and causing them to reciprocally pivot or oscillate about their longitudinal axes (26) during part of their circular sweep, so that the operating tools 19 move in a similar oscillatory fashion to lay the fodder in the form of a windrow. In the example shown in FIG. 2, the pivoting action takes place near the center of the machine, so as to produce a single windrow between the two raking wheels 1 and 2. It will be seen that the tool-carrying arms 18 extend in a direction substantially tangential of a circle inscribed in the raking wheel 1 or 2.

For tedding, said rollers 24 are disengaged from the guide cam 22 and each tool carrying arm 18 is prevented from turning about its longitudinal axis 26 (FIGS. 5 and 6). Throughout their circular sweep, the working tools 19 remain in a same plane relative to the shaft 11 of the corresponding raking wheel 1 or 2. In this position, the working tools 19 have an effective action on the fodder.

The change of the tool-carrying arms 18 and the rollers 24 from the windrowing setting to the tedding setting is achieved by pivoting the support bearings 17 about their respective pivoting axes 16 through an angle of about 90°. The arms 18 are thus brought into a substantially radial position, which leads to an increase in the diameter of the path followed by their operating tools or implements 19. The paths followed by the operating implements 19 of the two neighboring raking wheels 1 and 2 thus partially overlap as shown in FIG. 2. The result is "meshing" of their operating tools or implements 19, which advantageously results in a light stirring of the fodder. On the other hand, because of the inclination of the pivoting axes 16 of the support bearings 17 relative to shaft 11, the tool-carrying arms 18 are lifted slightly, as they move into the tedding setting. Thus, when the raking wheels 1 and 2 subtend an angle with the direction of movement A as described previously, all the operating tools 19 on each arm 18 come into contact with the ground during the forward part of their sweep. This ensures that a good contact is maintained with the fodder during the forward part of the sweep. In addition, due to this lifting motion, the operating tools 19 are angled slightly outwardly and away from the raking wheel, which facilitates the detachment of the fodder from the tools 19 during the rear portion of their sweep.

To switch from the tedding setting to the windrowing setting, the tool-carrying arms 18 should be pivoted about the pivoting axes 16 of their respective support bearings 17 in the opposite direction to that serving to bring them into the tedding setting.

In accordance with the invention each raking wheel 1 or 2 is provided with static guidance means 28 adjacent the cam means 22 to guide positively the rollers 24 into the guide cam 22 from any position they occupy near the cam, when passing from the tedding setting to the windrowing position. These guidance means 28 take the form of at least one inclined guide member 29 which forms an extension of the lower wall 30 of the guide cam 22 in the area of its upward change of level 27 and over which the rollers 24 of the studs or cranks 23 roll, when being returned to the guide cam 22 for the purposes of windrowing. The guide member 29 extends outwardly and downwardly substantially to the level of the flat area of the cam 22. Because of the presence of the guide member 29, the rollers 24 are able to be returned to the guide cam 22 automatically in the area of its upper level 27.

In order to facilitate the rolling movement of the rollers 24 over the guide member 29, it is advantageous for the outer surface of the guide member 29 to form an angle alpha between 5° and 60°, with the pivoting axis 16 of the support bearings 17. Thus, when the rollers 24 are forced against the guide member 29 with a certain pressure, they automatically tend to roll upwards towards the holding groove 27.

The guidance means 28 may further include a second inclined guide member 31 which is an extension of the upper wall 32 of the guide cam 22 in its substantially flat end zone. This guide member 31 extends outwardly and upwardly substantially to a region halfway between the upper level 27 of the guide cam 22 and its lowest level, the guide member 31 forming an angle beta with the pivoting axis 16 of the support bearings 17. Advantageously, the angle beta will assume a value between 5° and 60°. Thus, the guide member 31 automatically guides the rollers 24 coming in contact therewith towards the guide cam 22 and forms a security screen restraining the rollers 24 from engaging with any portion of the mechanism above the guide cam 22, when the rollers 24 are switched to the windrowing setting.

In accordance with another feature of the invention, the cam follower means of the machine include guide means 33 for guiding the tool-carrying arms 18 towards the tedding setting, and for immobilizing them in this position, whatever the position of the rollers 24 may have been with respect to the guide cam 22, when they were switched from the windrowing setting to the tedding setting. The guide means 33 include a pin 34 disposed on the end of the tool-carrying arms 18 facing the shaft 11 of the corresponding raking wheel 1 or 2, and stop means, such as a stop member 35 for each arm 18. The stop members 35 are advantageously secured to the end of the shafts 16 of the support bearings 17, the shafts 16 being locked to the hub 13 of the corresponding raking wheel 1 or 2. The stop members 35 are provided with an outwardly flaring guide slot 36, in which the pins 34 engage. The pins 34 are located substantially diametrically opposite the respective studs or cranks 23 of the tool-carrying arms 18. Due to this arrangement, the guide means 33 are relatively close to the center of the raking wheels 1 or 2 and protected from dust and from being entangled by the fodder.

Each slot 36 communicates with a locking notch 37 in which the pins 34 are engaged when the tool-carrying arms 18 are in the tedding setting. The notches 37 then lock the pins 34 in place, and thus restrain the tool-carrying arms 18 from pivoting about their longitudinal axes 26 in the tedding setting.

The two flanges 38 and 39 defining the slot 36 form stop faces limiting the travel of the pins 34, when the position of the tool-carrying arms 18 is switched. Thus, with the aid of the flanges 38 and 39 any movements of the rollers 24 can be limited, so that the rollers 24 are disposed substantially opposite the flat end zone of the guide cam 22 or the guide members 29 and 31 of the guide cam 22, when switching from the tedding setting to the windrowing setting. On the other hand, as soon as the rollers 24 are disengaged from the guide cam 22, when switching to the tedding setting, the pins 34 come into contact with the flanges 38 and 39, which guide them towards the locking notch 37. In order to avoid impairment of the windrowing action, the opening at the mouth of the notch 37 is at least equal to the movement locus or predetermined traveling distance, of the pins 34, when the tool-carrying arms 18 pivot about their longitudinal axis 26 due to the rollers 24 being engaged with the guide cam 22 during windrowing.

The stop members 35 advantageously have an arcuate or part-circular shape centered around the pivoting axes 16 of the support bearings 17. As a result, the pins 34 remain engaged in the slots 36 throughout the switching cycle of the tool-carrying arms 18 from one operating setting to the other.

Due to the guidance means 28 and the guide means 33, all the tool-carrying arms 18 on the same raking wheel 1 or 2 can be switched simultaneously from the windrowing to the tedding setting, and vice versa. In the example shown in FIGS. 3 to 6, the simultaneous adjustment of all the tool-carrying arms 18 on the same raking wheel 1 or 2 is achieved by linking their support bearings 17 to a cover 40 surrounding the bearings 17. This linking operation, best seen in FIGS. 3 and 4, uses pivots 41 secured to the cover 40 and engaging in cavities 42 defined in arms 43, the arms 43 being rigid with the support bearings 17. The cover 40 is freely rotatable on the hub 13 of the raking wheels 1 or 2. However, the cover 40 can also be locked in relation to the hub 13 in at least two positions, one corresponding to the windrowing setting of the tool-carrying arms 18, and the other to the tedding setting. The locking of the cover 40 may be carried out with the aid of a bolt 44, best seen in FIG. 5, articulated on the hub 13 and engaging, under the influence of a spring, in notches or catches 45 provided on a circular reinforcement 46 of the cover 40. To switch the tool-carrying arms 18 from one operating position to the other, it is merely necessary to unbolt the cover 40, and to push or pull one of the arms 18 so as to pivot it with its support bearing 17 about its pivoting axis 16. In the course of this pivoting movement, the bearing 17 entrains all the other bearings 17 on the same raking wheel 1 or 2 through the aid of the cover 40, and thus brings about a change in the operating position of all the tool-carrying arms 18 on the corresponding raking wheel. In the new operating position the bolt 44 re-engages with a notch or catch 45 of the reinforcement 46 in order to lock the cover 40, and with it the support bearings 17 of the tool-carrying arms 18 connected thereto. To operate the bolt 44, access apertures 47 have been provided in the cover 40.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A haymaking machine for tedding and windrowing, comprising in combination:
a frame,
at least one raking wheel drivably mounted on said frame for rotation about a center axis,
cam means centered about said center axis, forming an endless loop within a predetermined axial range therearound, and rigid with said frame,
a plurality of support bearings, a plurality of tool-carrying arms operatively connected to said raking wheel and mounted in said support bearings, respectively, said arms being switchable between a tedding position, in which said arms project radially outwards, and a windrowing position, in which said arms extend in a direction substantially tangential of a circle inscribed in said raking wheel, each arm being oscillatable about its longitudinal axis, and including cam follower means connected near the inner end of each arm, guidance means adjacent said cam means for guiding each cam follower means into engagement with said cam means in said windrowing position from any position occupied by each cam follower means near the periphery of said cam means, and guide means, including a pin disposed at an end of each tool-carrying arm, facing said center axis, and stop means located near said axis and provided with a guide slot for receiving said pin, whereby each arm operatively oscillates about its longitudinal axis within a predetermined angle in said windrowing position, and is free from oscillation in said tedding position.

2. A haymaking machine as claimed in claim 1, wherein said pin travels a predetermined distance when a corresponding tool-carrying arm operatively oscillates about its longitudinal axis upon being engaged with said cam means, and wherein said guide slot is flaring outwardly and has an opening at the mouth which is at least equal to said predetermined distance.

3. A haymaking machine as claimed in claim 1, wherein said cam means comprises a cam with an upper and a lower wall and having a substantially flat zone and an upwardly curved part, and wherein said guidance means include engaging means disposed on the periphery of said cam and including at least one guide member inclined to said center axis and forming an extension of said lower wall in said upwardly curved part thereof, said guide member extending downwardly substantially up to said flat zone.

4. A haymaking machine as claimed in claim 1, wherein each stop means is arcuate.

5. A haymaking machine as claimed in claim 1, further comprising a plurality of support bearings for each of said tool-carrying arms, each support bearing having a longitudinal axis inclined at a prearranged angle with said center axis, and wherein said guide member subtends a prearranged angle (alpha) with said longitudinal axis.

6. A haymaking machine as claimed in claim 1, wherein said cam means comprises a cam with an upper and a lower wall and having a substantially flat end zone, and further comprising a plurality of support bearings for each of said tool-carrying arms, each support bearing having a longitudinal axis inclined at a prearranged angle with said center axis, and wherein said guidance means further include a second guide member extending outwardly and upwardly from the said upper wall in the substantially flat end zone of said cam, said second guide member forming a predetermined angle (beta) with said longitudinal axis.

7. A haymaking machine as claimed in claim 1, wherein said support bearings for each of said tool-carrying arms extend downwardly and outwardly from a location near said center axis.

8. A haymaking machine as claimed in claim 1, wherein said guide slot is flaring outwardly.

9. A haymaking machine as claimed in claim 8, wherein said cam follower means of each tool-carrying arm include a stud projecting therefrom, and wherein each pin is located substantially diametrically opposite a corresponding stud.

10. A haymaking machine as claimed in claim 1, wherein each guide slot is formed with a locking notch at its converging end for a corresponding pin to latch therewith in the tedding position.

* * * * *